(12) United States Patent
Lehane (10) Patent No.: US 7,724,681 B2
(45) Date of Patent: May 25, 2010

(54) APPARATUS AND METHOD FOR ROUTING PACKETS IN A NETWORK

(75) Inventor: Andrew Lehane, Kinross-shire (GB)

(73) Assignee: Agilent Technologies, Inc., Santa Clara, CA (US)

( * ) Notice: Subject to any disclaimer, the term of this patent is extended or adjusted under 35 U.S.C. 154(b) by 1037 days.

(21) Appl. No.: 11/260,846

(22) Filed: Oct. 27, 2005

(65) Prior Publication Data

US 2006/0104217 A1      May 18, 2006

(30) Foreign Application Priority Data

Nov. 16, 2004    (GB)    ................. 0425201.1

(51) Int. Cl.
*H04J 1/16*     (2006.01)
(52) U.S. Cl. ...................... 370/252; 370/429
(58) Field of Classification Search ............... 370/252, 370/389, 429, 412, 390, 392; 709/227, 224; 713/168; 395/200; 707/4
See application file for complete search history.

(56) References Cited

U.S. PATENT DOCUMENTS

| | | | | |
|---|---|---|---|---|
| 5,793,976 | A * | 8/1998 | Chen et al. | 709/224 |
| 6,363,056 | B1 | 3/2002 | Beigi et al. | |
| 6,873,618 | B1 * | 3/2005 | Weaver | 370/390 |
| 7,457,868 | B1 * | 11/2008 | Guo | 709/224 |
| 2001/0039580 | A1 * | 11/2001 | Walker et al. | 709/224 |
| 2002/0112060 | A1 * | 8/2002 | Kato | 709/227 |
| 2002/0161755 | A1 * | 10/2002 | Moriarty | 707/4 |
| 2003/0210694 | A1 * | 11/2003 | Jayaraman et al. | 370/392 |
| 2004/0008716 | A1 * | 1/2004 | Stiliadis | 370/429 |
| 2004/0098479 | A1 * | 5/2004 | Bennett | 709/224 |
| 2004/0193881 | A1 * | 9/2004 | Ayaki et al. | 713/168 |
| 2007/0076703 | A1 * | 4/2007 | Yoneda et al. | 370/389 |
| 2007/0115840 | A1 * | 5/2007 | Feick et al. | 370/252 |

FOREIGN PATENT DOCUMENTS

| | | |
|---|---|---|
| EP | 1 341 345 A1 | 9/2003 |
| EP | 1 401 147 A1 | 3/2004 |
| EP | 1 152 570 A2 | 11/2004 |
| WO | WO 02/33893 A2 | 4/2002 |
| WO | WO 2004/059922 A2 | 7/2004 |

OTHER PUBLICATIONS

McGregor M. Luckie Waikato University, "IP Measurement Protocol (IPMP)" IETF Standard-Working-Draft, Internet Engineering Task Force, IETF, CH, No. 4, Feb. 2004.
European Search Report Mar. 10, 2006.
EP Search Report, Mar. 8, 2004.

* cited by examiner

*Primary Examiner*—Kwang B Yao
*Assistant Examiner*—Syed Bokhari (57) ABSTRACT

In a packet switched network, network data can be recorded for measurement by transmitting a measurement packet across the network to store path records as it travels from an originating measurement device to a destination device. Some of the network devices located along the path traversed by the measurement packet are capable of recognizing that the measurement packet no longer has any further storage capacity for path records. The network device then copies or clones the measurement packet and erases the path record data from the original measurement packet. The original measurement packet then continues on its path to the destination address collecting further path records on the way, while the cloned packet is returned to the measurement host for processing of the path records when all cloned packets and the original measurement packet return to the measurement host.

25 Claims, 4 Drawing Sheets

E = Echo packet
SEQ = Cloned packet sequence number (for example, 3 bits gives up to 7 clone and forward operations, if no clones had occurred then the flag would be set to zero).
O = Marks the original packet that is emptied and continues onward after cloning, returned full packets have this flag unset.
S = Singleton packet
I = Information request packet
R = Request packet = 1/ response packet = 0
C = Flag is set when a clone is requested by packet (usually at the behest of a previous router that was unable to clone the packet)
ID = The process identity, or at least 7 least significant bits, or a hash signature, of task on the sending host that initiated the measurement. Used to ensure that the cloned packets from two concurrent measurements run between the same source and destinations can be uniquely identified.

*Fig. 3*

Fig. 4

APPARATUS AND METHOD FOR ROUTING PACKETS IN A NETWORK

CROSS-REFERENCE TO RELATED APPLICATIONS

This application claims priority from British Patent Application No. 0425201.1, filed on Nov. 16, 2005.

This invention relates to an apparatus and method for routing packets in a network, particularly, to an apparatus and method for routing measurement packets in a packet switched network.

BACKGROUND OF THE INVENTION

In modern communications systems (in particular the Internet) it has become desirable to measure network performance. The Internet is a major world-wide packet switched telecommunications network and is a collection of heterogeneous networks all using a set of networking protocols, otherwise known as the IP suite. The IP suite has been developed to allow cooperating computers to share resources across the network. The IP suite incorporates many other networking protocols, which all perform different tasks within a network, such as UDP (User Datagram Protocol), ICMP (Internet Control Message Protocol), ARP (Address Resolution Protocol) and RTP (Real Time Protocol).

A number of working groups within IETF (Internet Engineering-Task Force) do standardization work on TCP/IP and related protocols, which are documented in "Requests for Comments" (RFCs).

There are many Internet Service Providers (ISPs) that provide access to Internet-based services for their business and residential customers and the number of users and the size of the networks is increasing rapidly. This recent rapid expansion looks set to continue and evolving commercial services e.g. on-line shopping, and new technologies such as xDSL and 3G, which provide speech and video services, will further increase the pressure on ISPs to provide better services and service guarantees.

ISPs use traffic engineering to make efficient usage of available network resources and it has become a common desire to measure network performance in order for the ISPs to meet pre-defined Quality of Service (QoS) and Service Level Agreements (SLA's) with their customers.

Currently known technologies are not adequately suited to the task of measuring the performance of modern telecommunications networks, such as the Internet. This is because the protocols currently being implemented are not scalable or efficient, as they were not designed to be used to measure large scale and increasingly more complex modern networks.

Existing tools used for monitoring networks such as the Internet Control Message Protocol (ICMP) are limited in their applicability for the task of network performance monitoring. One reason for this is that routers are designed and optimized for the purpose of forwarding packets and therefore, routers are inappropriate measurement targets. In addition, tasks which require a high level of network resources are processed with a low priority, or not at all, in order to minimize or negate the effect of a malicious attack on the network, based on one of these resource intensive tasks. This has led a number of Internet service providers (ISP's) to disable the ICMP feature on their networks.

A need therefore exists for a measurement protocol for modern networks which is efficient and scalable. An example of such a measurement protocol has already been proposed and is called the "IP measurement protocol (IPMP)". IPMP has been disclosed in an Internet Draft by Bennett and McGregor [Network working Group, Waikato University November 2003] and may become a widely adopted Internet standard.

The principle of this protocol is to use measurement packets, or active packets, to allow routers to participate in measurement by the insertion of path information into the measurement packet as it passes between a pair of hosts, or other measurement device.

The packet size in IPMP is restricted such that it has the highest possible degree of transmission compatibility across the network. The limit placed on the packet size has the effect that at some point the packet will become unable to collect any more data from the routers as it travels on the network between two measurement devices. This limitation in the amount of data which the measurement packets can collect therefore limits the numbers of measurements that can be made of the network.

The present invention seeks to address this limitation; however the present invention is not limited to IPMP or the measurement application and could be applied in other protocols and applications. Specifically, the particular problem which the present invention seeks to address arises from the restricted byte size of the IPMP data packets.

BRIEF SUMMARY OF THE INVENTION

The present invention therefore seeks to provide a method and apparatus for routing measurement packets in a network, which overcomes, or at least reduces the above-mentioned problems of the prior art:

Accordingly, in a first aspect, the invention provides an apparatus for routing a measurement packet being transmitted across a packet switched network between a source node and a destination node for collecting measurement data regarding the network, the apparatus comprising:

a measurement packet detector for detecting receipt of a first measurement packet;

a processing element, coupled to the detector for determining whether the first measurement packet fulfills a criterion for being forwarded on in the network to collect more measurement data;

a packet replicating element for creating a replica measurement packet if the criterion is not met, such that one of the received and replica measurement packets is empty of collected measurement data; and a packet routing element for routing on in the network to collect more data either the first measurement packet if the criterion is met or the measurement packet that is empty of data if the criterion is not met.

In one embodiment, the packet replicating element routes on in the network as the measurement packet that is empty of data the replica measurement packet.

The packet replicating element may flag the measurement packet that is empty of data and is routed on in the network as being an emptied measurement packet.

Furthermore, the packet replicating element may provide the measurement packet that is empty of data and is routed on in the network with an updated count of how many replica measurement packets have been created based on a count within the received measurement packet of how many replica measurement packets were previously created from that received measurement packet.

If a replica measurement packet is created by the packet replicating element, the packet routing element may route the measurement packet that is not empty of data to a measurement data collection device.

The packet replicating element may flag the measurement packet that is not empty of data as being a non-emptied measurement packet.

Furthermore, the packet replicating element may provide the measurement packet that is not empty of data with a non-empty sequence number based on a count within the received measurement packet of how many replica measurement packets were previously created from that received measurement packet.

In a second aspect, the invention provides a system for collecting measurement data on packet switched networks between a source node and a destination node, the system comprising:

a measurement packet generator for generating a measurement packet for collecting measurement data regarding the network as it is transmitted across the network;

apparatus as described above for routing the generated measurement packet; and a measurement data collection device for collecting measurement packets and collating the measurement data therefrom such that it forms part of a sequence comprising linked measurement data relating to the network between the source and destination nodes.

The measurement data collection device may determine the sequence of measurement data according to non-empty sequence numbers provided in the collected measurement packets.

In one embodiment, the collection device determines that a complete sequence of measurement packets has been received when a measurement packet having a flag indicating that it is an emptied measurement packet has been collected.

The collection device may determine that a complete sequence of measurement packets has been received when a predetermined time period has expired.

According to a third aspect, the invention provides a method for routing a measurement packet being transmitted across a packet switched network between a source node and a destination node for collecting measurement data regarding the network, the method comprising the steps of:

detecting receipt of a first measurement packet;

determining whether the first measurement packet fulfills a criterion for being forwarded on in the network to collect more measurement data;

creating a replica measurement packet if the criterion is not met, such that one of the received and replica measurement packets is empty of collected measurement data; and routing on in the network to collect more data either the first measurement packet if the criterion is met or the measurement packet that is empty of data if the criterion is not met.

The criterion for determining whether to create a replica measurement packet can be either whether the received measurement packet is substantially full of collected measurement data or whether the measurement packet will reach another packet replicating element along its projected route before it becomes full of collected measurement data.

The method may further comprise the step of flagging the measurement packet that is empty of data and is routed on in the network as being an emptied measurement packet.

The method may further comprise the step of providing the measurement packet that is empty of data and is routed on in the network with an updated count of how many replica measurement packets have been created based on a count within the received measurement packet of how many replica measurement packets were previously created from that received measurement packet.

The method may further comprise the step of routing the measurement packet that is not empty of data to a measurement data collection device if a replica measurement packet is created.

The method may further comprise the step of flagging the measurement packet that is not empty of data as being a non-emptied measurement packet.

The method may further comprise the step of providing the measurement packet that is not empty of data with a non-empty sequence number based on a count within the received measurement packet of how many replica measurement packets were previously created from that received measurement packet.

In a fourth aspect the invention provides a method for collecting measurement data on packet switched networks between a source node and a destination node, the method comprising the steps of:

generating a measurement packet for collecting measurement data regarding the network as it is transmitted across the network;

routing a measurement packet utilising the steps of the method as described above; and collecting measurement packets and collating the measurement data therefrom such that it forms part of a sequence comprising linked measurement data relating to the network between the source and destination nodes.

The method for collecting measurement data may further comprise the a step of determining the sequence of measurement data according to non-empty sequence numbers provided in the collected measurement packets.

The method for collecting measurement data may further comprise the step of determining that a complete sequence of measurement packets has been received when a measurement packet having a flag indicating that it is an emptied measurement packet has been collected.

The method for collecting measurement data may further comprise the step of determining that a complete sequence of measurement packets has been received when a predetermined time period has expired.

In one embodiment, the network is the Internet and the measurement packets are consistent with IP Measurement Protocol.

BRIEF DESCRIPTION OF THE DRAWINGS

One embodiment of the invention will now be more fully described, by way of example, with reference to the drawings, of which.

DETAILED DESCRIPTION OF THE DRAWINGS

One particular problem which the present embodiment of the invention seeks to address arises because networks such as the internet use a wide variety of protocols to exchange information. It is desired to restrict the byte size of data packets used in measurement of the network such that fragmentation or packet loss is minimised in the network. Although the IP measurement protocol has been designed to achieve this, the packet size in IPMP is restricted such that it has the highest possible degree of transmission compatibility across a network. In IPMP, packets are transported on a network collecting data for performance monitoring as they travel. The limit placed on the data capacity of the packet has the effect that at some point the packet will become unable to collect any more data from the routers as it travels on the network between two measurement devices.

Figure 1:
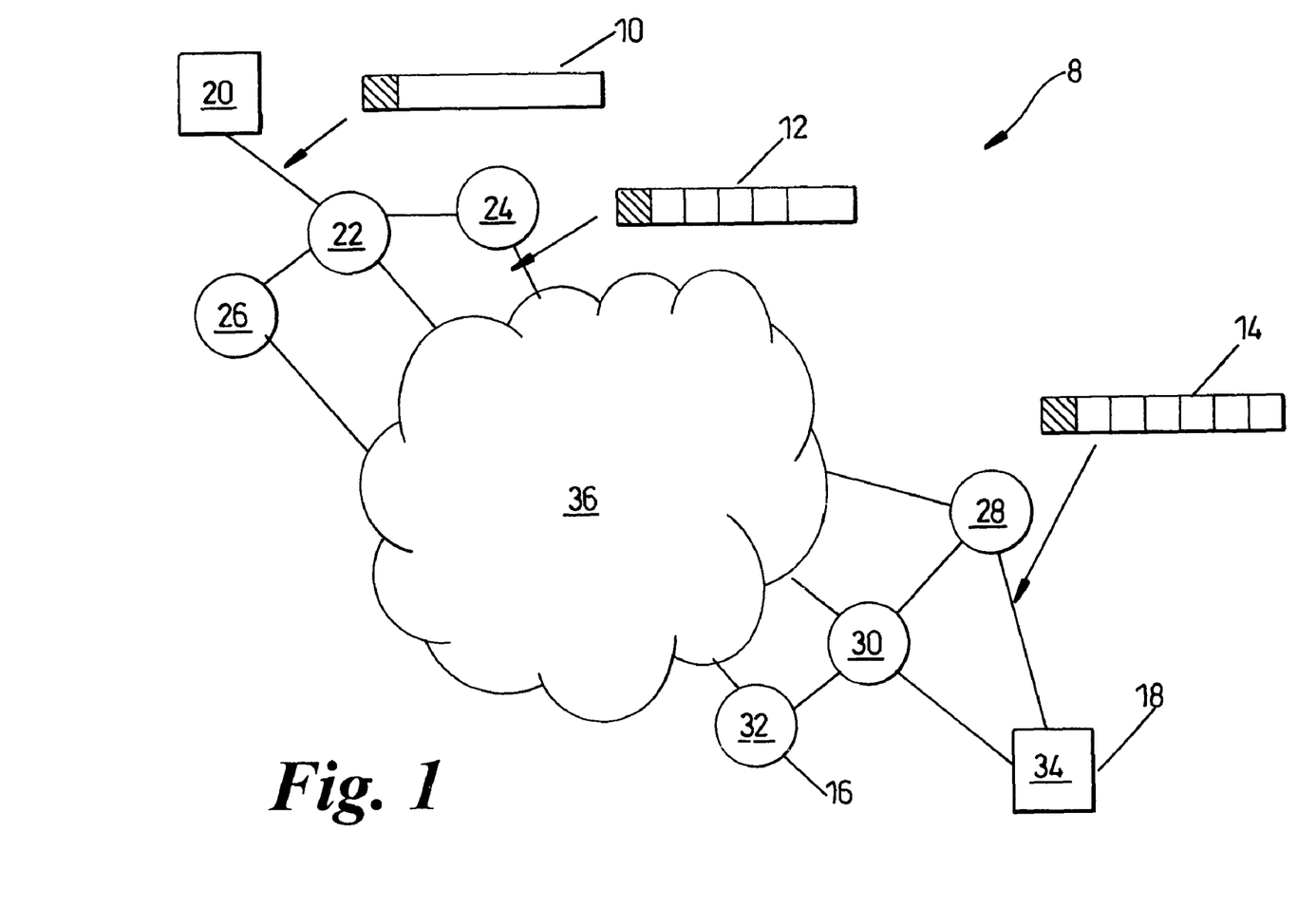
FIG. 1 shows schematic diagram of a network system.

FIG. 1 is a schematic diagram illustrating the architecture of a communications network 8, upon which measurements of the network performance are to be made using IPMP and in which it is envisaged an embodiment of the present invention may be utilized. It will be appreciated by those skilled in the art that other embodiments of the invention could be used in other communications networks, utilizing protocols other than IPMP. The network 8 comprises a plurality of nodes 20, 22, 24, 26, 28, 30, 32, 34, of which two different types of node have been shown having different devices located thereat. Measurement hosts 18 are located at nodes 20 and 34 and routers 16 are located at nodes 22, 24, 26, 28, 30, 32. The routers 16 control the path taken by data traveling on the network 8. The measurement hosts control measurement of the network and may also be a collection point for the data. There may additionally be in the network nodes of types different to those shown.

In the network 8, the nodes 20, 22, 24, 26, 28, 30,32, 34 may include any addressable device attached to the network 8 that can recognize, process, or forward data transmissions. There is also shown in the drawing a portion 36 of the network 8 about which little or nothing is known of the topology or architecture. Not much would therefore be known about the devices attached to nodes in the unknown portion 36 of the network 8, other than the fact that some attached devices will behave as routers and have the capability to route packets of data to their destinations. The routers 16 shown in FIG. 1 are capable of utilizing the IP measurement protocol, and will be described as IPMP aware routers 16. It is of course possible that there may be some routers or other devices on the network 8 which are not IPMP aware, but these have not been shown. Two measurement hosts 18 are located at the two nodes 20, 34, between which it is desired to measure the performance of the network 8. In this case node 20 is a source node from which the measurement begins and the node 34 is a destination node where the measurement may terminate, or may be reflected to measure the network on a return path back to the source node 20.

There are multiple possible routes along which the data can travel. Two data packets with the same source and destination address need not follow the same path. This makes the task of network measurement difficult. IPMP seeks to overcome these difficulties by using a special packet type called an "active packet" or measurement packet 10, 12, 14. The measurement packets 10, 12, 14 are designed to appear as if they belong to the existing IP stream, and optionally may appear as Transport Control Protocol (TCP), or User Datagram Protocol (UDP), data streams. The design of the measurement packets 10, 12, 14 ensures they get realistic treatment by the network equipment, such as the routers 16, as they traverse the network 8. The packets are also designed so that they can be easily processed and require approximately the same level of processing as normal IP packets.

The measurement packet 10, as shown in FIG. 1, is generated by the measurement host 18, at the source node 20, to collect data about the network 8 as it traverses the network 8. When the measurement packet 10 passes through a router 16, the router 16 adds a path record to the measurement packet 10 containing information such as the routers address and the time at which the measurement packet 10 passed through, also known as a timestamp. The timestamp is the time at which the router completed receiving the measurement packet 10, and should represent the time that the last bit of the measurement packet 10 was received. There may be other data added to the measurement packet 10, for example information regarding the accuracy of the timestamp, the type of address, and/or the time-to-live (TTL). TTL is a value in a packet that tells a network router whether or not the packet has been in the network 8 too long and should be discarded, its inclusion could allow identification of areas in the network 8 where a path record was not inserted.

The measurement packet 10 also includes a checksum, which is a count of the number of bits in a packet, or transmission unit. The checksum is calculated by the measurement host and is included within the measurement packet 10. Its purpose is to allow a node receiving the measurement packet 10 to check whether the packet has been somehow corrupted in transit. If the checksum is correct, it is assumed that the complete transmission was correctly received. IPMP aware routers that insert a path record update the checksum such that the checksum reflects the contents of the measurement packet 10 after insertion of the path record.

Another measurement packet 12 is shown in FIG. 1. In this measurement packet 12, data has been added in the form of path records by the routers 16. In this case the routers 16, located at nodes 22 and 24, have added their respective addresses and a timestamp indicating the time the measurement packet 12 passed through each router 16. The problem with this system resides in the limited storage space available to store the path records because the packet size in IPMP has been restricted to be no larger than the smallest common layer 2 media maximum transmission unit size. This limit is approximately 576 bytes which equates to approximately 22 separate path records. The limit exists to prevent unwanted fragmentation of the measurement packet 12 or the measurement packet 12 being discarded. In order to measure network performance over the entire path, traveled by the measurement packet 10, 12, 14, each hop requires insertion of a separate path record. There are already existing routes on the public internet with more than 22 hops. It would therefore not be possible to record the entire path on one of these routes. If the measurement packet 10, 12, 14 are configured to be returned, or echoed, by the destination measurement host 20, only 11 hops can be measured in any one direction.

A hop represents one portion of the path between the source node 20 and destination node 34. For example, when communicating over the network 8, data passes through the devices, routers 16, at the intermediate nodes 22, 24, 26, 28, 30, 32. Data is viewed as "hopping" between these intermediate nodes 22, 24, 26, 28, 30, 32, from one node on the network 8 to another.

One proposed solution to the problem of limited storage capacity has been to selectively make measurements on some of the IPMP aware routers 16 and not on others, for example, by only adding path records on every "nth" IPMP aware router 16, where n is an integer number. An IPMP aware router is one which is capable of adding a record of the path to the measurement packet 10, 12, 14. The value of n could then be decreased to increase, the number of separate path records added to the measurement packet 10, 12, 14. There are problems with this approach however. Firstly, it assumes that the delay of each section of the path, or hop, is fixed whilst the test is performed. If the delay varies more as n decreases, it would be difficult to determine the cause of this increase. Furthermore, it would require more information to travel the network 8 to determine which routers insert a path record, either in the form of control messages sent to the routers 16, or an additional piece of information to be contained within the measurement packet 10, 12, 14.

Therefore, according to one embodiment of the invention, at least some of the network devices, such as the routers 16, are capable of recognizing that a measurement packet 14 no longer has any further storage capacity for path records. The network device then copies or clones measurement packet 14, the path record data is erased from the original measurement packet 14, which continues on its path to the destination address collecting further path records on the way. The cloned packet, not shown in FIG. 1, is then returned to the measurement host 18 at the node 20 which originated the measurement, by changing the source address to be the destination address, and placing the address of the cloning device as the source address and recalculating a new checksum.

Figure 2:
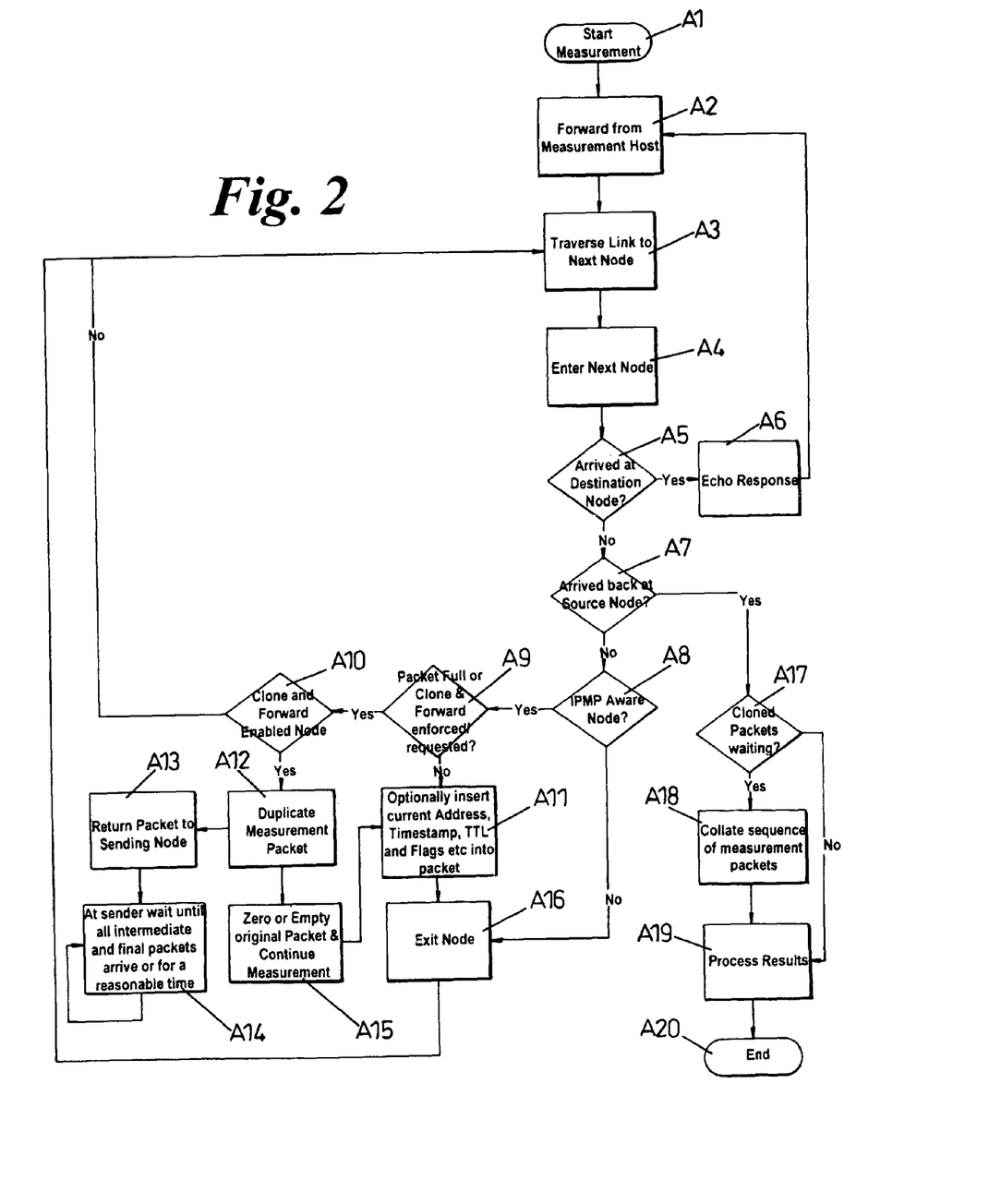
FIG. 2 shows a simplified schematic flow chart of the operation of a processing method according to one embodiment of the present invention.

FIG. 2 shows a simplified flow chart of the basic steps of collecting measurement data in a network according to this embodiment:

A1—This step is the start of the measurement, whereby a measurement packet 10 is created at the measurement host 18 with the necessary information to make the desired measurement, such as source and destination address, echo request and an initial time stamp. Step A2 is then executed.

A2—This step is carried out when step A1 has been executed. The measurement packet 10 is forwarded on its way to the next node on the network 8. Step A3 is then executed.

A3—This step follows step A2. The measurement packet 10, 12, 14 travels the network 8 on its way to the next node. The measurement packet 10, 12, 14 may experience a delay whilst traveling the network 8, and it will be appreciated that the measurement packet 10, 12, 14 could be traveling on either a wired or wireless medium; This step is followed by step A4.

A4—This step follows step A3. The measurement packet 10, 12, 14 enters a receiving node. This step is followed by step A5

A5—This step follows step A4. The receiving node queries the measurement packet 10, 12, 14 to determine whether or not it is the destination address. If the answer is "yes", such that the receiving node is the measurement packet's 10, 12, 14 destination, then step A6 is executed; if the answer is "no", such that the receiving node is not the measurement packet's 10, 12, 14 destination, then step A7 is executed.

A6—This step follows if a positive result is returned by step A5. The measurement packet 10, 12, 14 is echoed back to the measurement host 18 at the source node 20. This is achieved by exchanging the source address for the destination address and vice versa. The measurement packet 10, 12, 14 is additionally marked as an echoed packet, so as to prevent the measurement packet from being continually being bounced back and forth. This step is followed by step A2. The process then continues in the reverse direction of the network according to the same procedure. In alternative embodiments the measurement packet 10, 12, 14 may not be returned to the measurement host 18 at the source node 20, but the data may be processed at the destination node 34 according to steps A17-A20.

A7—This step follows a negative result from step A5. The receiving node interrogates the measurement packet 10, 12, 14 to determine if it has arrived back at the source node 20, that is, the measurement host 18 which initiated the measurement. If the measurement packet 10, 12, 14 has arrived back at the source node 20, a positive result is returned, and step A17 is executed; if not, a negative result is returned and step A8 is executed.

A8—This step is executed if a negative result is returned from step A7. The measurement packet 10, 12, 14 determines if the device at the receiving node is IPMP enabled. This may simply be achieved by a non-enabled device failing to recognize that the packet is an IPMP measurement packet 10, 12, 14. If the device is not IPMP enabled, a negative result is returned and the process 15, moves on to step A16; if the device is IPMP enabled then step A9 is carried out.

A9—This step is executed if the result for step A8 is positive, such that the device is IPMP enabled. The receiving node determines if a clone-and-forward process should be executed on the measurement packet 10, 12, 14. In this embodiment, the clone-and-forward process is executed if the measurement packet 10, 12, 14 is full, that is the measurement packet 10, 12, 14 does not have sufficient capacity to store any more path records. In alternative embodiments the rules governing the clone-and-forward process may be different, for example, in the situation where it is known that the path comprises more than 22 hops and that the node on the network 8 where the measurement packet 10, 12, 14 will become full does not support clone-and-forward processing. The clone-and-forward process could be enforced by instructing a previous node, which the measurement packet 10, 12, 14 passes through, to carry out the clone-and-forward processing. Alternatively the measurement packet 10, 12, 14 may contain information within it which will instruct a router 16 to carry out a clone-and-forward process when a predetermined criterion is met. If it is determined that a clone-and-forward process should be carried out, then a positive result is returned and step A10 follows. If not, a negative result is returned and step A11 is carried out.

A10—This step follows a positive result from step A9. If the receiving node is capable of performing a clone-and-forward process, then step A12 is carried out. If not, then step A3 is carried out, the measurement packet is assumed to be full, and the measurement packet traverses to the next node.

A11—This step follows a negative result from step A9 or from A15. The IPMP aware receiving node may insert the address of the receiving node and a timestamp and any other designated information into the measurement packet 10, 12, 14. Step A16 automatically follows execution of step A11.

A12—This step follows from a positive result from step A10. The receiving node makes a duplicate copy or clone of the measurement packet 10, 12, 14. Steps A13 and A15 both follow from execution of step A12.

A13—This step follows from execution of step A12. The duplicated measurement packet is returned to the measurement host 18, which sent the original packet probe, at the source node 20. The source address from the original measurement packet 10, 12, 14 is made the destination address in the duplicate measurement packet and the address of the duplicating node is made the source address and the duplicate measurement packet is marked as a cloned measurement packet. The cloned measurement packet may also be marked in such a way that if it forms part of a series of cloned measurement packets, then the path record data can be collated in the order they were collected. It will be appreciated that the duplicate measurement packet could be sent to any device coupled to the network. This step is followed by A14.

A14—This step follows from step A13. The measurement host 18 waits until all the cloned measurement packets and the final measurement packet arrive back at the measurement host 18, or alternatively, the measurement host 18 waits for a specified period of time. The final measurement packet can be recognized by the fact that it is the only packet probe that returns to the measurement host which has not been cloned, although the measurement packet may be flagged in some way to indicate that it is the "original" packet and that clones have been made of it. Indeed, it could incorporate a counter that can be updated every time a clone is made. In this way, every clone can be sequentially numbered from the counter, and the measurement host can also determine how many clones were produced from the counter once the measurement packet returns to the measurement host. Furthermore, the measurement packets may have some form of identification so that one measurement trace can be distinguished from another, i.e. when the measurement host is making multiple measurement traces on the network 8 at the same time, especially if the source and destination address is the same.

A15—This step follows from step A12. The measurement data, in the form of path records, is erased from the original measurement packet 10, 12, 14. This may be achieved by filling the section of the measurement packet 10, 12, 14 carrying the measurement data with zeros. The measurement packet 10, 12, 14 is now ready to continue making measurements. This step is followed by step A11. Of course, if the cloned and the original measurement packet are identical, it does not matter which is emptied and sent on its way and which is returned full to the measurement node. Alternatively, the cloned measurement packet may be created empty.

A16—This step follows from A11 or from a negative result from A8.

The original measurement packet 10, 12, 14 exits the receiving node to continue traversing the network 8 collecting measurement data until either it becomes full again, or it completes the measurement. This step is followed by step A3.

A17—This step follows from a positive result from step A7. The measurement packet 10, 12, 14 arrives back at the source node 20. The source node 20 determines if there are any cloned packets waiting that relate to the measurement packet 10, 12, 14 received. If there are none, then step A19 is executed, if there are cloned measurement packet waiting then step A18 is executed. Of course, the device would first need to check whether a received packet is a cloned packet. If it is, then it is stored until all the related packets are collected.

A18—This step is executed if the result returned from step A17 is positive, i.e. there are cloned measurement packets waiting to be collated. The measurement packet 10, 12, 14 is collated with those already waiting such that the data collected is in the correct sequence, in order of collection. This step is followed by step A19.

A19—This step follows from step A18 or from return of a negative result in step A17. The measurement data collected is processed to determine the network performance. Areas of the network 8 which are causing excessive delays can be identified. This step is followed by step A20.

A20—This step follows from step A19. The measurement process is complete.

Figure 3:
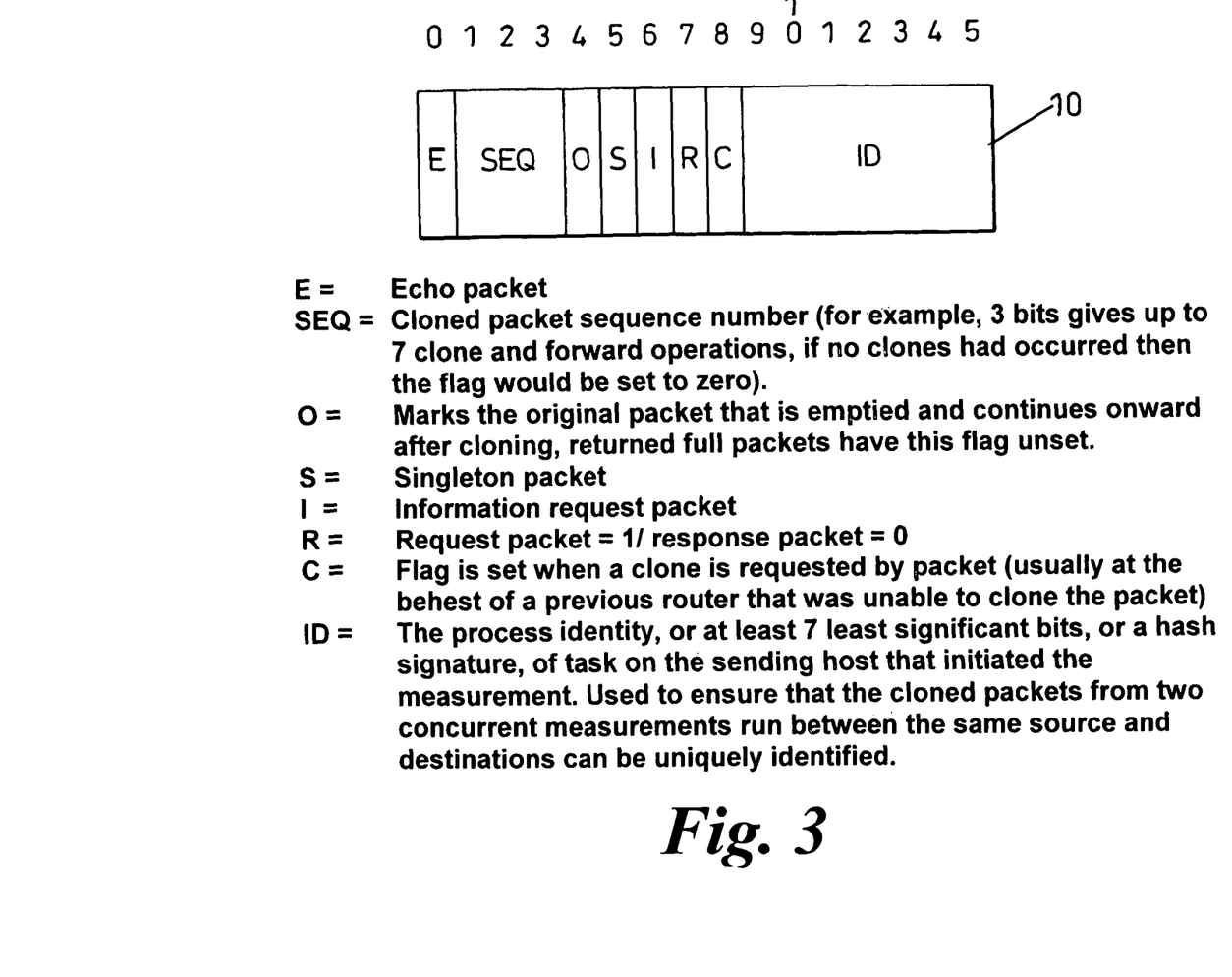
FIG. 3 shows a schematic diagram a structure for the packet probe to implement sequencing of packet probes.

FIG. 3 shows a format for the measurement packet 10 which would enable sequencing of the cloned packet probes. This suggested design for sequencing the packets created on each clone-and-forward operation is based upon the current IPMP Options field. In this format, the clone-and-forward 'SEQ' option would use one or more, up to the maximum of the 4 bits available, of the previously reserved bits numbered 1 through 3, as shown in FIG. 3. Using a consecutive set of bits would be one particular option from a range of possible design options. The more bits used the more clone-and-forward operations could be supported. The packet that is emptied and continues on to collect more measurements is marked by the 'O' flag being set. The checksum is updated as the 'O' flag is changed and 'SEQ' flag is incremented at each clone-and-forward operation. A valid checksum is usually necessary for cloned, as well as original packets. The ID, used to differentiate between two concurrent measurements between the same source and destination, could be the process ID of the task initiating the measurement on the source host or, alternatively, it could be created using a simple counter that recorded the number of seconds from 0 to 255. Since it is unlikely that two measurements will be active after 4 minutes, rollover of the counter is not likely to be a problem. Of course, this would mean that only one measurement per second could be made.

Alternatively, another octet could be set aside for the 'SEQ' flags within the packet but this would result in an overall reduction in the available space for any measurement payload, although it would allow many more clones to be made.

It is envisaged that the clone-and-forward process could be carried out by a router 16, either in hardware or in software. It is envisaged that time sensitive elements of the cloning process would be performed on the "fast path" of the router 16. Generally routers 16 have a "fast path" and a "slow path", the "fast path" being optimized for the simple task of packet forwarding often employing efficient high-speed, fixed function devices such as custom Application-Specific Integrated Circuits (ASICs) for the task. Other tasks such as administrative or other complex tasks may be carried out on the "slow path". These tasks which require extra processing power/resources are not handled on the "fast path", since they would affect the performance of the router packet forwarding ability. The "slow path" often employs a general purpose processor. It is also envisaged that non-time sensitive portions of the clone and forward process would be performed on the slow path so that no detrimental effect would be incurred on the "fast path". The aim is that the measurement's integrity would not be affected by the extra clone and forward processing, since the measurement data would already have been captured and the original packet sent onto the next router.

It will be appreciated that although only one embodiment of the invention has been described in detail, various modifications and improvements can be made by a person skilled in the art without departing from the scope of the invention.

For example step A10 could be carried out before step A9, although this may be at the expense of a small drop in efficiency of the process. The step A9 could be carried out as the measurement packet 10, 12, 14 exits the router 16 rather than as it enters, as is the case of the above-described embodiment. The process of cloning the measurement packet 10, 12, 14 and forwarding an empty measurement packet 10, 12, 14 may be triggered by some event or rule other than the measurement packet 10, 12, 14 being unable to hold any further path records, for example, if it is known that the path comprises more than 22 hops and that the node on the network 8 at which the measurement packet 10, 12, 14 will become full does not support clone-and-forward processing. The clone-and-forward process could be enforced by instructing a previous node which the packet passes through, to carry out the clone-and-forward process. Alternatively, the measurement packet 10, 12, 14 may contain information within it which will instruct a router 16 to carry out a clone-and-forward when a predetermined criterion is met. The process may be changed such that instead of cloning-and-forwarding the original packet, a new measurement packet is created by the IPMP aware node and the original measurement packet 10, 12, 14 is returned to the sending node 20. Nor is it essential that the cloned packet be returned to the measurement host 18 which was the source node 20 of the measurement; they could be sent to the measurement host 18 at the destination node 34, or some other third party.

Figure 4:
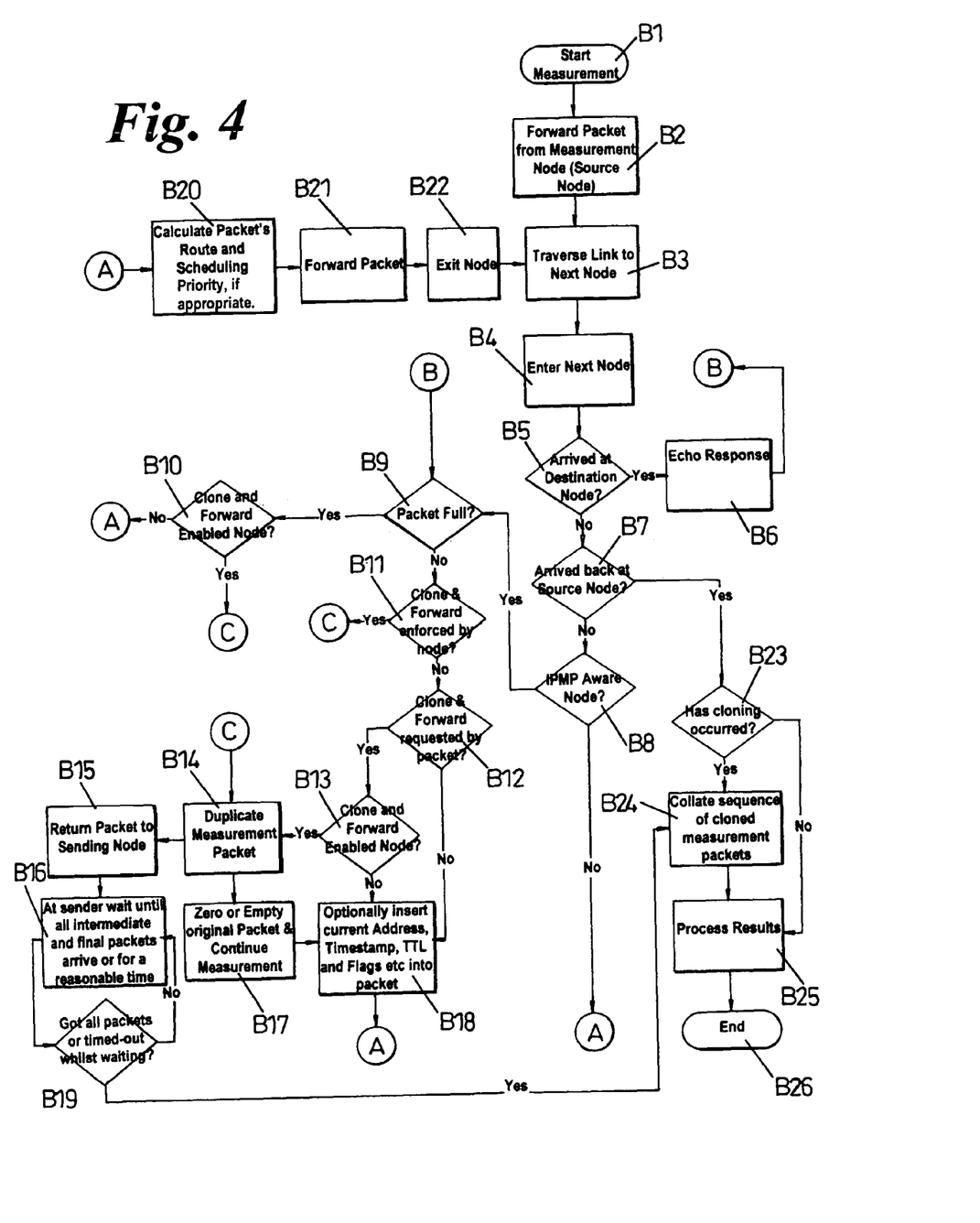
FIG. 4 shows a more detailed schematic flow chart of the operation of a processing method according to the embodiment of the present invention.

FIG. 4 shows an example of a more detailed implementation of the process, including some changes that could be made to the embodiment previously described.

B1—This step is the start of the measurement, a measurement packet 10 is created at the measurement host 18 with the necessary information to make the desired measurement, such as source and destination address, echo request and an initial time stamp. Step B2 is then executed.

B2—This step is carried out after step B1 has been executed. The measurement packet 10 is forwarded on its way to the next node on the network 8. Step B3 is then executed.

B3—This step follows step B2. The measurement packet 10, 12, 14 travels the network 8 on its way to the next node. The measurement packet 10, 12, 14 will, of course experience a delay whilst traveling the network 8, and it will be appreciated that the measurement packet 10, 12, 14 could be traveling on either a wired or wireless medium. This step is followed by step B4.

B4—This step follows step B3. The measurement packet 10, 12, 14 enters a receiving node. This step is followed by step B5

B5—This step follows step B4. The receiving node queries the measurement packet 10, 12, 14 to determine whether or not it is the destination address. If the answer is "yes", i.e. the receiving node is the measurement packet's 10, 12, 14 destination, then step B6 is executed. If the answer is "no", i.e. the receiving node is not the destination, then step B7 is executed.

B6—This step follows if a positive result is returned by step A5. The measurement packet 10, 12, 14 is echoed back to the measurement host 18 at the source node 20. This is achieved by exchanging the source address for the destination address and vice versa. The measurement packet 10, 12, 14 is additionally marked as an echoed packet, which prevents the measurement packet from continually being bounced back and forth. This step is followed by step B9. The process then continues in the reverse direction according to the same procedure after first being interrogated to see if a clone-and-forward process is required. In alternative embodiments the measurement packet 10, 12, 14 may not be returned to the measurement host 18 at the source node 20, but the data may be processed at the destination node 34 according to steps B23 to B26.

B7—This step follows a negative result from step B5. The receiving node then interrogates the measurement packet 10, 12, 14 to determine if it has arrived back at the source node 20, that is, the measurement host 18 which initiated the measurement. If the measurement packet 10, 12, 14 has arrived back at the source node 20, a positive result is returned and step B23 is executed. If not, a negative result is returned and step B8 is executed.

B8—This step is executed if a negative result is returned from step B7. The measurement packet 10, 12, 14 determines if the device at the receiving node is IPMP enabled. This may simply be achieved by a non-enabled device failing to recognize that the packet is an IPMP measurement packet 10, 12, 14. If the device is not IPMP enabled, a negative result is returned and step B20 is carried out. Otherwise, if the device is. IPMP enabled, then step B9 is carried out.

B9—This step is executed if the result for step B8 is positive, i.e. the device is IPMP enabled. The receiving node determines if a clone-and-forward process should be executed on the packet probe 10, 12, 14, which, in this embodiment occurs if the measurement packet 10, 12, 14 is full, i.e. if the measurement packet 10, 12, 14 does not have sufficient capacity to store any more path records. In alternative embodiments, the rules governing the clone-and-forward process may be different. If, for example, in the situation where it is known that the path comprises more than 22 hops and that the node on the network 8 at which the measurement packet 10, 12, 14 will become full does not support clone-and-forward processing, the clone-and-forward process could be enforced by instructing a previous node, which the measurement packet 10, 12, 14 passes through, to carry out the clone-and-forward processing. Alternatively the measurement packet 10, 12, 14 may contain information within it which will instruct a router 16 to carry out a clone-and-forward process when a predetermined criterion is met. If it is determined that a clone-and-forward process should be carried out, then a positive result is returned and step B10 follows. If not, a negative result is returned and step B1 is carried out.

B10—This step follows a positive result from step B9. If the receiving node is capable of performing a clone-and-forward process, then step B14 is carried out. If not, then step B20 is carried out, the packet is full and cannot accommodate the measurement data, and the measurement packet 10, 12, 14 begins the process of traversing to the next node.

B11—This step follows a negative result from step B9. The receiving node may enforce a clone-and-forward operation to be carried out. If a clone-and-forward process is required by the receiving node, then step B14 follows. If not, then step B12 follows.

B12—This step follows a negative result from step B11, such that a clone-and-forward process has not been enforced by the receiving node. In such a case, as mentioned above, the 'C' flag is set in the options of the measurement packet. The measurement packet 10, 12, 14 may thus "request" that the receiving node carry out a clone-and-forward operation. If the measurement packet 10, 12, 14 requests this, then step B13 is carried out, if not then step B18 is carried out.

B13—This step follows a positive result from step B12. If the receiving node is capable of performing a clone-and-forward process, then step B14 is carried out. If not then step B18 is carried out, followed by step B20, where the measurement packet 10, 12, 14 begins the process of traversing to the next node.

B14—This step follows from a positive result from steps B10, B11 or B13. The receiving node makes a duplicate copy or clone of the measurement packet 10, 12, 14. In this case, the 'SEQ' flags are incremented in both the cloned and the original packet and the 'O' flag in the cloned packet is unset. Steps B15 and B17 both follow from execution of step B14.

B15—This step follows from execution of step B14. The duplicated measurement packet is returned to the measurement host 18, which sent the original measurement packet 10, 12, 14, at the source node 20. The source address from the original measurement packet 10, 12, 14 is made the destination address in the duplicate packet and the address of the duplicating node is made the source address. The duplicate measurement packet is marked as a cloned packet by unsetting the 'O' flag. The cloned packet may also be marked by incrementing the 'SEQ' flag so that its place in the series of cloned packets can be determined so that the path record data can be collated in the order they were collected. It will be appreciated that the duplicate measurement packet could be sent to any device coupled to the network. This step is followed by B16.

B16—This step follows from step B15. The measurement host 18 waits for all the cloned measurement packets and the final measurement packet to arrive back at the measurement host 18, or alternatively, the measurement host 18 waits for a specified period of time, after which it is assumed that all packets have been received. The mechanism described above allows the measurement host know how many times a packet has been cloned by reading the 'SEQ' number in the original measurement packet, when it returns.

The initial/original packet has the 'O' flag set when the measurement starts, and it collects data until it becomes full, or a clone operation is enforced for another reason i.e. because it might become full before it can be cloned. When the packet is first cloned, the 'SEQ' flag in both the clone and the original packet is set to one (assuming it was zero before). The cloned packet then has the 'O' flag unset and is sent back to the source. This is the first clone. At the next clone-and-forward process, both packets have the 'SEQ' flag updated to a value of two. The cloned copy packet again has the 'O' flag unset, whereas the original, now empty, forwarded packet still has its 'O' flag set but now has a 'SEQ' flag value of two. At the next clone-and-forward process, the 'SEQ' flag is updated to the value of three, with the 'O' flag being changed to unset on the clone. The cloned packet now knows it is the third packet in the sequence and the original packet, which is marked by the 'O' flag knows that three clones have been returned to the source. Once the measurement is complete, the system waits for the original packet to return; this is the packet marked with the 'O' flag set. On inspecting this original packet's 'SEQ' flag, the number of cloned packets can be determined and a check can be made to ensure all clones have safely made it back to the source. A timeout can still be used to counter the possibility of a lost original packet, one with the 'O' flag' set, or a lost clone, where a part of the sequence is missing.

Furthermore, if two measurements are run concurrently between the same source and destination nodes, the system may get confused as it will not know how to stitch the two concurrent measurements data back together again. In order to overcome this problem, the process number of the task that created the measurement can be used as a unique identifier; this is convenient and avoids the software having to persistently store a list of active measurements. Most Operating Systems have a process number for each task; if a process number is not available, then it could be based upon the number of seconds passed counting from 0 to 255 as an alternative. It is unlikely that two measurements will be active after 4 minutes so rollover of the counter is not a problem. Step B19 follows this step.

B17—This step follows from step B14. The measurement data, in the form of path records, is erased from the original measurement packet 10, 12, 14. This may be achieved by filling the section of the measurement packet 10, 12, 14 carrying the measurement data with zeros. The measurement packet 10, 12, 14 is now ready to continued making measurements. This step is followed by step B18.

B18—The IPMP aware receiving node may insert the measurement data in the measurement packet, for example the address of the receiving node and a timestamp and any other designated information into the measurement packet 10, 12, 14. Step B20 automatically follows execution of step B18.

B19—This step follows from execution of step B16, when either all the measurement packets 10, 12, 14 have been received or the measurement host 18 "times out" waiting for them. If the measurement host 18 has "timed out" by waiting for a specified period of time, then step B16 is executed. If all measurement packet 10, 12, 14 have been received at the measurement host 18, then step B24 is executed.

B20—This step is executed on negative results from steps B8 or B10 or automatically follows step B18. The receiving node calculates the route the measurement packets 10, 12, 14 should follow and, if appropriate, their scheduling priority, plus the new checksum. Step B21 follows from execution of this step.

B21—This step follows from execution of step B20. The measurement packet 10, 12 14 is forwarded to the next node. Step B22 follows execution of this step.

B22—This step follows execution of step B21. The measurement packet 10, 12, 14 exits the receiving node on its route to the next node.

B23—This step follows from a positive result from step B7, where the measurement packet 10, 12, 14 has arrived back at the source node 20. The source node 20 determines if cloning has occurred by examining the 'SEQ' flag. A positive integer value indicates cloning has occurred, in which case, step B24 is executed. If no cloning has occurred, then step B25 is executed.

B24—This step is executed if the result returned from step B23 is positive, i.e. cloning has occurred. The sequence of measurement packets 10, 12, 14 is collated with those already waiting, such that the data collected is in the correct sequence. This step is followed by step B25.

B25—This step follows from step B24 or from return of a negative result in step B23. The measurement data collected is then processed to determine the network performance. Areas of the network 8 which are causing excessive delays can thus be identified. This step is followed by step B26.

B26—This step follows from step B25. The measurement process is complete.

It will be appreciated by those skilled in the art that the more detailed process flow shown in FIG. 4 only indicates a few of the changes which may be made to the described embodiment and that other changes could be made without departing from the scope of the invention.

The invention claimed is:

1. Apparatus for routing a measurement packet being transmitted across a packet switched network between a source node and a destination node for collecting measurement data regarding the network, the apparatus comprising: a measurement packet detector configured to detect receipt of a first measurement packet; a processing element, coupled to the detector and configured to determine whether the first measurement packet is capable of collecting a predetermined amount of additional measurement data; a packet replicating element configured to create a replica measurement packet if the first measurement packet is incapable of collecting the predetermined amount of additional measurement data, such that one of the first and replica measurement packets has an empty measurement data payload; and a packet routing element configured to route on in the network to collect more data either: the first measurement packet if the first measurement packet is capable of collecting the predetermined amount of additional measurement data; or the measurement packet with the empty measurement data payload if a replica measurement packet has been created, wherein the packet routing element is further configured to route the measurement packet without the empty measurement data payload to a measurement data collection device, if a replica measurement packet has been created.

2. Apparatus for routing a measurement packet according to claim 1, wherein the processing element is configured to determine that the first measurement packet is incapable of collecting the predetermined amount of additional measurement data when the first measurement packet is substantially full of collected measurement data.

3. Apparatus for routing a measurement packet according to claim 1, wherein the processing element is configured to determine that the first measurement packet is capable of collecting the predetermined amount of additional measurement data if the first measurement packet will reach another packet replicating element along its projected route before it becomes full of collected measurement data.

4. Apparatus for routing a measurement packet according to claim 1, wherein the packet replicating element routes on in the network the replica measurement packet as the measurement packet that has the empty measurement data payload.

5. Apparatus for routing a measurement packet according to claim 1, wherein the packet replicating element flags the measurement packet that has the empty measurement data payload and is routed on in the network as being an emptied measurement packet.

6. Apparatus for routing a measurement packet according to claim 1, wherein the packet replicating element provides the measurement packet that has the empty measurement data payload and is routed on in the network with an updated count of how many replica measurement packets have been created based on a count within the received measurement packet of how many replica measurement packets were previously created from that received measurement packet.

7. Apparatus for routing a measurement packet according to claim 6, wherein the packet replicating element flags the measurement packet without the empty measurement data payload as being a non-emptied measurement packet.

8. Apparatus for routing a measurement packet according to claim 1, wherein the packet replicating element provides the measurement packet without the empty measurement data payload with a non-empty sequence number based on a count within the received measurement packet of how many replica measurement packets were previously created from that received measurement packet.

9. A system for collecting measurement data on packet switched networks between a source node and a destination node, the system comprising: a measurement packet generator for generating a measurement packet for collecting measurement data regarding the network as it is transmitted across the network; apparatus according to claim 1 for routing the generated measurement packet; and a measurement data collection device for collecting measurement packets and collating the measurement data therefrom such that it forms part of a sequence comprising linked measurement data relating to the network between the source and destination nodes.

10. A system according to claim 9, wherein the measurement data collection device determines the sequence of measurement data according to non-empty sequence numbers provided in the collected measurement packets.

11. A system according to claim 9, wherein the collection device determines that a complete sequence of measurement packets has been received when a measurement packet having a flag indicating that it is an emptied measurement packet has been collected.

12. A system according to claim 9, wherein the collection device determines that a complete sequence of measurement packets has been received when a predetermined time period has expired.

13. A system according to claim 9, wherein the network is the internet and the measurement packets are consistent with IP Measurement Protocol.

14. A method for routing a measurement packet being transmitted across a packet switched network between a source node and a destination node for collecting measurement data regarding the network, the method comprising: detecting receipt of a first measurement packet; determining whether the first measurement packet is capable of collecting a predetermined amount of additional measurement data; creating a replica measurement packet if the first measurement packet is incapable of collecting the predetermined amount of additional measurement data, such that one of the first and replica measurement packets has an empty measurement data payload; routing on in the network to collect more data either: the first measurement packet if the first measurement packet is capable of collecting the predetermined amount of additional measurement data; or the measurement packet with the empty measurement data payload if a replica measurement packet has been created; and routing the measurement packet without the empty measurement data payload to a measurement data collection device, if a replica measurement packet has been created.

15. A method for routing a measurement packet according to claim 14, further comprising determining that the first measurement packet is incapable of collecting the predetermined amount of additional measurement data when the first measurement packet is substantially full of collected measurement data.

16. A method for routing a measurement packet according to claim 14, further comprising determining that the first measurement packet is capable of collecting the predetermined amount of additional measurement data if the first measurement packet will reach another packet replicating element along its projected route before it becomes full of collected measurement data.

17. A method for routing a measurement packet according to claim 14, further comprising the step of flagging the measurement packet that has the empty measurement data payload and is routed on in the network as being an emptied measurement packet.

18. A method for routing a measurement packet according to claim 14, further comprising the step of providing the measurement packet that has the empty measurement data payload and is routed on in the network with an updated count of how many replica measurement packets have been created based on a count within the received measurement packet of how many replica measurement packets were previously created from that received measurement packet.

19. A method for routing a measurement packet according to claim 14, further comprising the step of flagging the measurement packet without the empty measurement data payload as being a non-emptied measurement packet.

20. A method for routing a measurement packet according to claim 14, further comprising the step of providing the measurement packet without the empty measurement data payload with a non-empty sequence number based on a count within the received measurement packet of how many replica measurement packets were previously created from that received measurement packet.

21. A method for collecting measurement data on packet switched networks between a source node and a destination node, the method comprising: generating a measurement packet for collecting measurement data regarding the network as it is transmitted across the network; routing a measurement packet utilizing the steps of the method according to claim 14; and collecting measurement packets and collating the measurement data therefrom such that it forms part of a sequence comprising linked measurement data relating to the network between the source and destination nodes.

22. A method for collecting measurement data according to claim 21, further comprising the step of determining the sequence of measurement data according to non-empty sequence numbers provided in the collected measurement packets.

23. A method for collecting measurement data according to claim 21, further comprising the step of determining that a complete sequence of measurement packets has been received when a measurement packet having a flag indicating that it is an emptied measurement packet has been collected.

24. A method for collecting measurement data according to claim 21, further comprising the step of determining that a complete sequence of measurement packets has been received when a predetermined time period has expired.

25. A method for collecting measurement data according to claim 21, wherein the network is the internet and the measurement packets are consistent with IP Measurement Protocol.

* * * * *